(12) United States Patent
Brunskill

(10) Patent No.: US 11,333,539 B2
(45) Date of Patent: May 17, 2022

(54) FLOW RATE METERING DEVICE

(71) Applicant: INV_DISP_V01, LLC, Carlsbad, CA (US)

(72) Inventor: Ryan Wayne Brunskill, Goodyear, AZ (US)

( * ) Notice: Subject to any disclaimer, the term of this patent is extended or adjusted under 35 U.S.C. 154(b) by 54 days.

(21) Appl. No.: 16/952,717

(22) Filed: Nov. 19, 2020

(65) Prior Publication Data

US 2021/0156724 A1 May 27, 2021

Related U.S. Application Data

(60) Provisional application No. 62/939,266, filed on Nov. 22, 2019.

(51) Int. Cl.
*G01F 15/02* (2006.01)
*G01F 25/10* (2022.01)

(52) U.S. Cl.
CPC ............ *G01F 15/024* (2013.01); *G01F 25/10* (2022.01)

(58) Field of Classification Search
CPC ................................ G01F 15/024; G01F 25/10
See application file for complete search history.

(56) References Cited

U.S. PATENT DOCUMENTS

| | | | | |
|---|---|---|---|---|
| 4,704,910 | A | * 11/1987 | Conrad | G01N 1/26 73/863.31 |
| 5,395,603 | A | * 3/1995 | Hilakos | C01B 25/223 423/157.4 |
| 2006/0265933 | A1 | * 11/2006 | Knock | A01K 97/10 43/21.2 |
| 2006/0289564 | A1 | * 12/2006 | Porter | B29B 7/7409 222/145.7 |
| 2016/0298279 | A1 | * 10/2016 | Proudman | D06F 33/37 |

FOREIGN PATENT DOCUMENTS

| | | | |
|---|---|---|---|
| CN | 207036185 U | * | 2/2018 |
| JP | 06126698 A | * | 5/1994 |

* cited by examiner

*Primary Examiner* — Michael J Dalbo
(74) *Attorney, Agent, or Firm* — Eric Hanscom

(57) ABSTRACT

The present subject matter further relates to a flow rate metering device for measuring flow rate of multiple fluids of varied viscosities while being supplies to form a final mixture. The device includes a flow meter arranged on each of the plurality of feed lines of multiple fluids to measure a flow rate of respective fluid during each operation cycle; and a digital display unit coupled to each of the flow meters to display the flow rate of respective fluid during each operation cycle.

5 Claims, 4 Drawing Sheets

FLOW RATE METERING DEVICE

CROSS REFERENCE TO RELATED APPLICATIONS

This application claims priority back to U.S. Provisional No. 62/939,266, filed Nov. 22, 2019, the contents of which are incorporated by reference into this application.

STATEMENT REGARDING FEDERALLY SPONSORED RESEARCH OR DEVELOPMENT

This invention was not federally sponsored.

BACKGROUND OF THE INVENTION

Technical Field

The present disclosure relates generally to the general field of pump systems for metering viscous fluids. More specifically, the present disclosure relates to an improved flow rate metering device that provides for the mixing and dispensing of two or more fluids to form final mixture, for example, for automatic washing of cars and trucks.

Background

Background description includes information that may be useful in understanding the present subject matter. It is not an admission that any of the information provided herein is prior art or relevant to the presently claimed subject matter, or that any publication specifically or implicitly referenced is prior art.

Truck and car wash apparatus are generally well known in the art. A great variety of configurations have been and are being employed in the field. These vary from largely manually-operated devices to nearly completely automated machines. Whether the washing fluids are applied to a vehicle by an automated gantry, or the like, or by a hand-held wand, there must be some method or means for mixing fluids, such as chemicals or soaps, with the water. Such method or means should be accurate, economical and reliable.

There are several methods in use, all of which have some problem or another. One method which has been used is to mix one or more chemicals before being applied to a vehicle that is to be washed. Prior to being applied to the vehicle, each chemical is diluted using water. Dilution may occur in a solution tank, from which a point-of-use dispenser pulls the chemical(s)-water combination for application to a vehicle. Alternatively, dilution may also occur as the chemical(s) and water are being dispensed at substantially the same time by a point-of-use dispenser to a vehicle. In either case, the actual solution applied to each vehicle includes a concentration of one or more chemicals and water. A responsibility typically reserved for a vehicle wash operator relates to defining the type and amount of appropriate chemicals, and thus, concentrations thereof, that are to be applied by a vehicle wash facility to the various vehicles utilizing the facility.

Currently, vehicle wash operators will use an assortment of measuring beakers and scales along with chemical viscosity calculations to determine flow rate and usage. The chemicals being applied will be poured into a beaker that sits on a high-end scale. When the chemical flow's and is drawn out of the beaker, the amount drawn is noted along with the difference in weight. There is some critical math at this point that must be calculated into the process based on the chemical's viscosity and any other volume influence that affect the draw such as the size of a feed tubing that was dropped into the beaker. If any of the math that has been injected into this process is not accurate, the results are inaccurate. The manufacturers of the products typically provide this math for their chemicals, unfortunately, it is not always accurate. This then opens the door for a sizable percentage of error in the final calculations, as any errors can be magnified significantly further down the line of the operation. More or less, the vehicle wash operators have tolerated this issue due to being "close enough" is good enough.

Therefore, there is a need in the art to move into an electronic space for metering the amount of chemicals applied on a vehicle during a washing cycle which eliminates the need for any scales, beakers or math from the vehicle wash operators.

OBJECTS OF THE INVENTION

Some of the objects of the present disclosure, which at least one embodiment herein satisfy are as listed hereinbelow.

A general object of the present disclosure is to move into an electronic space for metering the amount of chemicals applied on a vehicle during a washing cycle which eliminates the need for any scales, beakers or math from the vehicle wash operators.

An object of the present disclosure is to provide a method or apparatus whereby chemicals could readily be mixed with water in a vehicle wash system which would not waste chemicals and/or time, and which would be reliable and accurate in operation.

Another object of the present disclosure is to provide an automated mechanism metering the amount of chemicals applied on a vehicle during a washing cycle which removes the inefficient method of physical inspection of usage of one or more chemicals and/or products involved in a vehicle washing.

These and other objects and advantages will become more apparent when reference is made to the following description and accompanying drawings.

SUMMARY

This summary is provided to introduce concepts related to an improved flow rate metering device that provides for the mixing and dispensing of two or more fluids to form final mixture, for example, for automatic washing of cars and trucks. The concepts are further described below in the detailed description. This summary is not intended to identify key features or essential features of the claimed subject matter, nor is it intended to be used to limit the scope of the claimed subject matter.

The present disclosure relates to a monitoring system for measuring quantity of multiple fluids of varied viscosities while being supplied to form a final mixture. The system includes a plurality of feed lines for feeding multiple fluids to a fluid intermixing device and a flow rate metering device arranged on each of the plurality of feed lines. The flow rate metering device includes a flow meter arranged on each of the plurality of feed lines to measure a flow rate of respective fluid during each operation cycle, and a digital display unit coupled to each of the flow meters to display the flow rate of respective fluid during each operation cycle. The system further includes a processor coupled to the digital display units to measure the quantity of respective fluid feed during each operation cycle based on the flow rate of that fluid.

In an aspect, each of the plurality of feed lines includes an input hole and an output hole.

In an aspect, the flow meters are mounted on a flow meter mounting plate using mounting holes.

In an aspect, the mounting holes are counter sunk on one side for tapered machine screw.

In an aspect, the mounting holes are having size of 3/16".

In an aspect, the mounting holes are formed of 1/4" thick Schedule 80 PVC.

The present subject matter further relates to a flow rate metering device for measuring flow rate of multiple fluids of varied viscosities while being supplies to form a final mixture. The device includes a flow meter arranged on each of the plurality of feed lines of multiple fluids to measure a flow rate of respective fluid during each operation cycle; and a digital display unit coupled to each of the flow meters to display the flow rate of respective fluid during each operation cycle.

The present subject matter further relates to a method for measuring quantity of multiple fluids of varied viscosities while being supplied to form a final mixture. The method includes receiving multiple fluids from a plurality of feed lines; intercepting a flow rate of each of the multiple fluids by a flow rate metering device arranged on each of the plurality of feed lines; and measuring, by a processor coupled to the flow rate metering device, a quantity of respective fluid feed during each operation cycle based on the flow rate of that fluid.

Various objects, features, aspects, and advantages of the inventive subject matter will become more apparent from the following detailed description of preferred embodiments.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
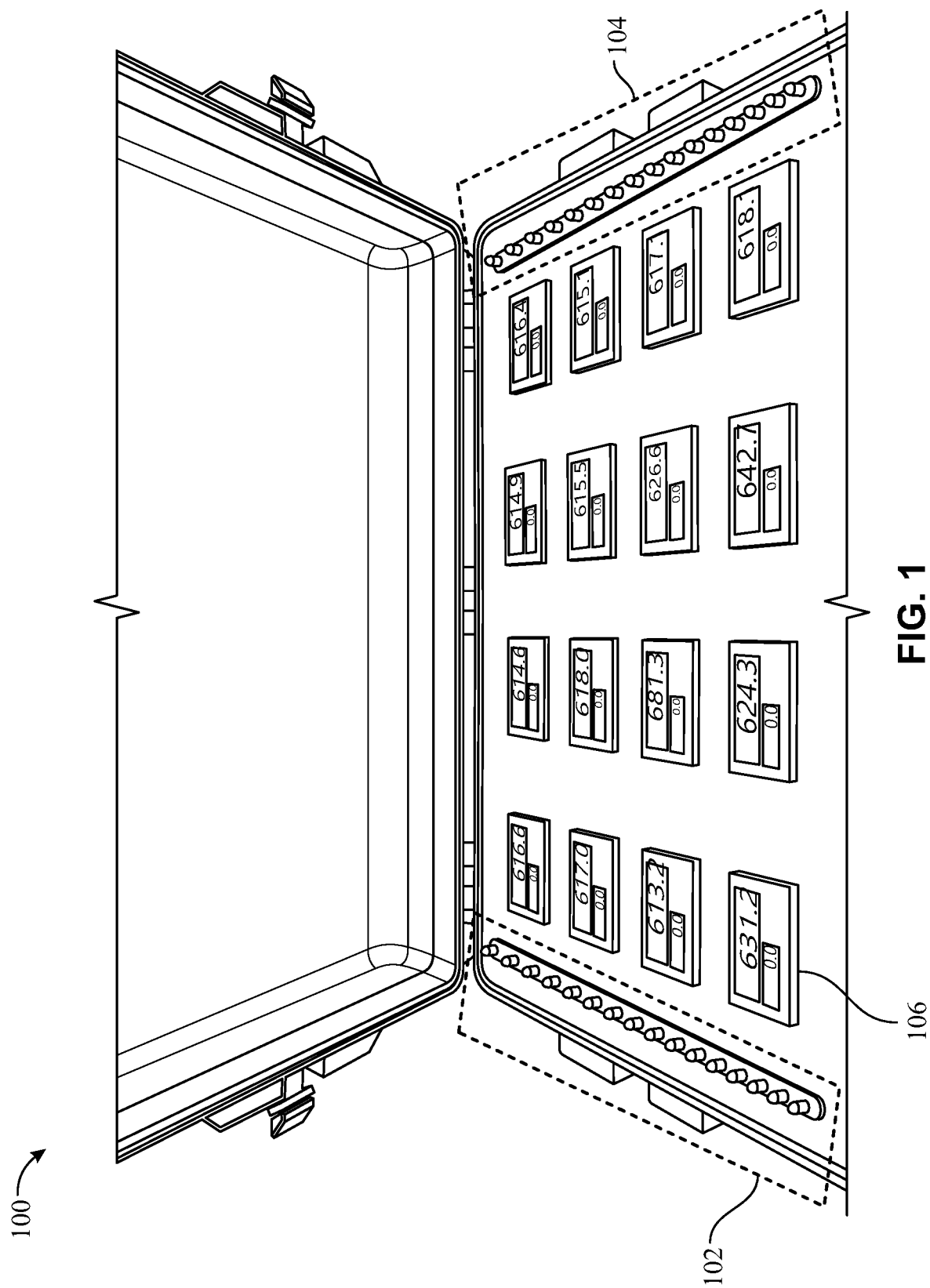
FIG. 1 illustrates a first example of a box-type flow rate metering device in accordance with an exemplary embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in a computer-readable medium and executed by a computer or processor, whether or not such computer or processor is explicitly shown.

DETAILED DESCRIPTION

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

The detailed description of various exemplary embodiments of the disclosure is described herein with reference to the accompanying drawings. It should be noted that the embodiments are described herein in such details as to clearly communicate the disclosure. However, the amount of details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternatives falling within the scope of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the tennis "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may, in fact, be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be noted that the present disclosure is not restricted to be used with a single vehicle-wash bay. Indeed, it is anticipated that the present disclosure will be used in conjunction with multiple vehicle-wash bays, wherein the variation of demand might be even greater and wherein the need for and desirability of the present inventive apparatus and method will be even greater.

An example of a box-type flow rate metering device, for measuring flow rate of multiple fluids of varied viscosities while being supplies to form a final mixture, is depicted in a diagrammatic view in FIG. 1, and is designated therein by a reference character 100. The flow rate metering device 100, or simply, device 100, can measure flow rates of up to sixteen products/fluids at the same time. Although the device 100 is shown with sixteen input holes 102 and sixteen output holes 104 for sixteen feed lines, the device 100 can be modified to increase or decrease the number of input and output holes 102, 104 without deviating from the scope of the present disclosure. In the example described herein, the device 100 can be brought to any type of vehicle-wash facility that is utilizing a dispensed metered fluid. The device 100 works by intercepting the feed line of any fluid to flow through the device 100. The fluid then exits the device 100 from output holes 104 to a fluid intermixing device (not shown in figures) at the facility is being used to dispense it. The device also contains quick-release fittings for the in and out connections. The quick-release fittings facilitate the ease of hooking up, and un-hooking the invention from chemical lines.

The device 100 includes flow meters 302-1, 302-2, 302-3, 302-4, collectively referred to as 302, (FIG. 3) arranged on each of the plurality of feed lines to measure a flow rate of respective fluid during each operation cycle. These flow meters 302 does not care what flows through or what is the viscosity of that fluid. Such flow meters 302 are further connected to respective digital display unit 106 (FIG. 1) which displays the flow rate of respective fluid during each operation cycle. Using the flow rate of the fluid, the quantity of respective fluid utilized during each operation can be measured.

With such configuration of the device 100, the proposed device 100 arranged on the feed lines of a vehicle-wash facility can cut the process time for an operator or manufacturer to calculate amount of the fluid usage by 80%. As can be appreciated by those skilled in the art, an express wash, for example, using sixteen fluids/products may take up to five hours for an individual to calculate the amount usage per fluid/product. However, with the proposed device 100, the quantity of respective fluid utilized during each operation can be measured electronically. Such measurement can be in a tenth of a millilitre of a fluid/product which was used in a given operation cycle, which enhances the accuracy of the measured data.

Figure 2:
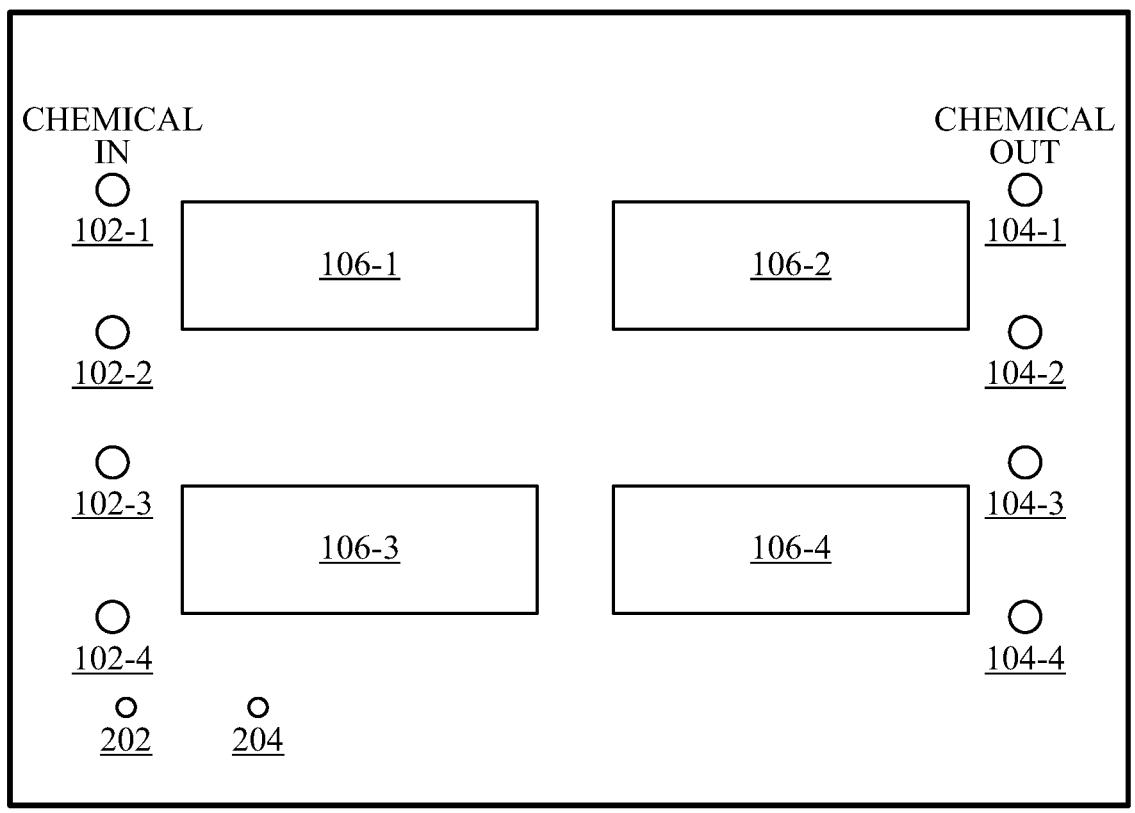
FIG. 2 illustrates a second example of a box-type flow rate metering device in accordance with an exemplary embodiment of the present disclosure.

FIG. 2 illustrates another example of the box-type flow rate metering device 100. In this example, the device 100 is designed as a mobile device with four input holes 102-1, 102-2, 102-3, 102-4 (collectively referred to as 102) and four output holes 104-1, 104-2, 104-3, 104-4 (collectively referred to as 104) for four feed lines. Each of these feed lines include a flow meter 302 coupled to respective digital display unit 106-1, 106-2, 106-3, 106-4 (collectively referred to as 106).

In this example shown in FIG. 2, the device 100 is connected to a power source 202. In an aspect, the power source 202 can be a 24 V direct current power source.

Further, the device 100 is connected to a circuit breaker reset button 204 to restrict the supply of the power from the power source 202. As can be appreciated by those skilled in the art, the circuit breaker reset button 204 will open/close a 3 Amp circuit breaker switch 306 arranged on a positive power supply line of the power source 202.

Figure 3:
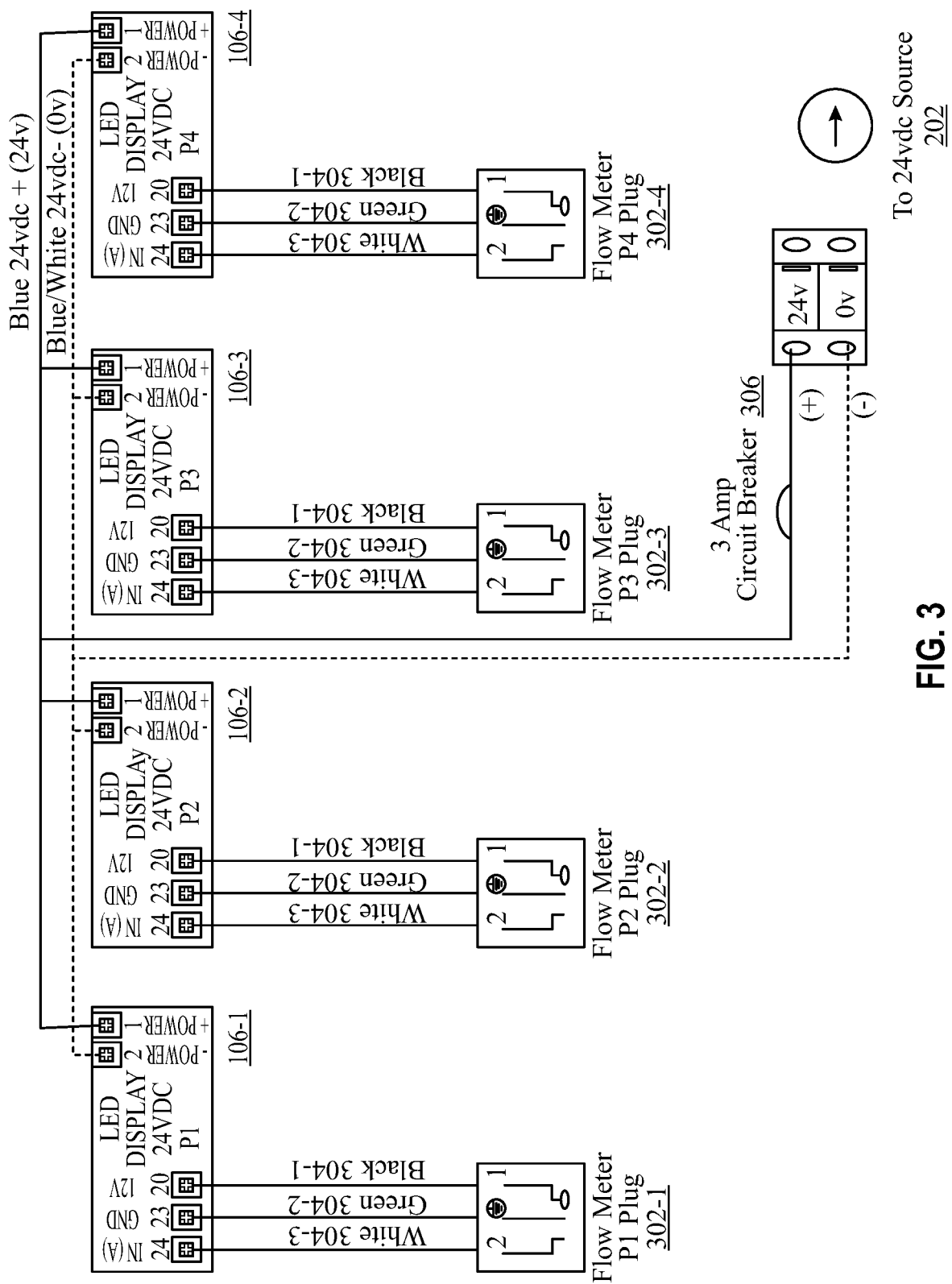
FIG. 3 illustrates electrical connection lines layout in the second first example of the box-type flow rate metering device in accordance with an exemplary embodiment of the present disclosure.

Yet further, the detailed line diagram of circuit layout of the power supply in the device 100 is shown in FIG. 3. As can be seen from FIG. 3, the negative power line (−) and the positive power line (+) of the power source 202 are connected to corresponding negative and positive terminals of respective digital display units 106. Each of these digital display units 106 includes three connection lines, namely 12 V positive line (Black) 304-1, Ground line (Green) 304-2, and negative line (White) 304-3), to establish an electronic connection with the respective flow meter 302.

In an aspect, each of the digital display units 106 include a Light Emitting Diode (LED) display to display the flow rate measured by a give flow meter 302 of respective fluid during each operation cycle.

Figure 4A:
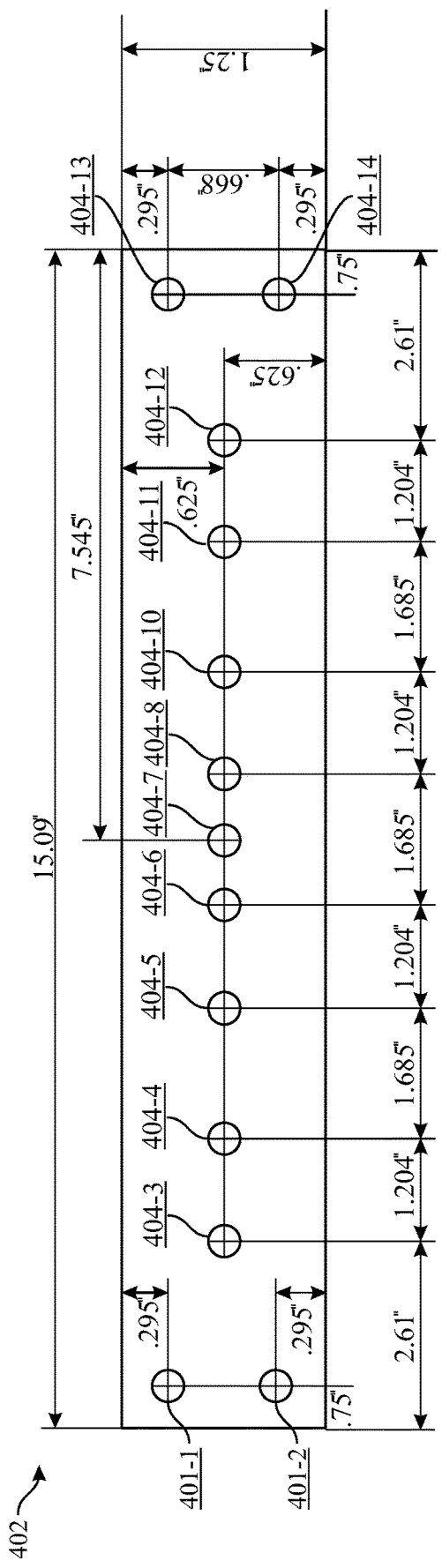
FIGS. 4A and 4B illustrates a mounting plate with mounting holes for mounting of flow meter on the flow rate metering device in accordance with an exemplary embodiment of the present disclosure.

Further, the flow meters 302 are mounted on a flow meter mounting plate 402 using mounting holes 404-1, 404-2, 404-3, 404-4, 404-5, 404-6, 404-7, 404-8, 404-9, 404-10, 404-11, 405-12, (collectively referred to as 404) as shown in FIG. 4A.

Figure 4B:
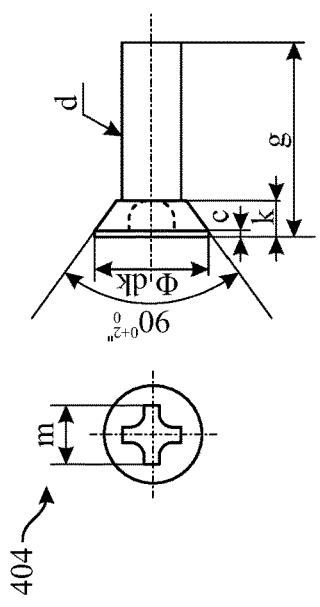

The mounting holes 404 are counter sunk on one side for tapered machine screw, as shown in FIG. 4B. The mounting holes 404 can have size of $\frac{3}{16}$" and may be formed of $\frac{1}{4}$" thick Schedule 80 PVC.

An exemplary configuration of the mounting holes 404 is shown below in the Table 1:

TABLE 1

| Screw Nominal (d) | Pitch P | Cross Hole Number | dk Reference Dimensions | Tolerance | k Reference | c Approx. | m Approx. |
|---|---|---|---|---|---|---|---|
| M4 | 0.7 | 2 | 8 | 0-0.5 | 1.3 | 0.3 | 4.1 |

Various modifications may be made to the present disclosure without altering its value or scope. For example, alternative methods and/or means for monitoring flow of the fluids and/or the chemicals might be employed.

The inventive system and device 100 and associated method for metering quantity of fluid supplied through the device 100 are intended to be widely used in the vehicle wash industry. In particular, the present disclosure is particularly applicable to vehicle washes, wherein a great quantity of chemicals is used and, thus, it is extremely important to keep the ratio of chemical to water solvent at an ideal proportion. It should be noted that the method and device proposed herein will work with almost any viscosity of chemical/product/fluid, and that the method and device can be adapted for use with a great variety of vehicle-washing facilities.

All of the above are only some of the examples of available embodiments of the present disclosure. Those skilled in the art will readily observe that numerous other modifications and alterations may be made without departing from the spirit and scope of the present disclosure. For example, the present disclosure may be used in systems other than vehicle-washing systems, such as conveyor-type vehicle wash systems, drive-through wash systems, or other types of stationary, variable demand spray-wash systems. Accordingly, the disclosure herein is not intended as limiting and the appended claims are to be interpreted as encompassing the entire scope of the invention.

While the foregoing describes various embodiments of the present disclosure, other and further embodiments of the present disclosure may be devised without departing from the basic scope thereof. The scope of the invention is determined by the claims that follow. The present disclosure is not limited to the described embodiments, versions or examples, which are included to enable a person having ordinary skill in the art to make and use the present disclosure when combined with information and knowledge available to the person having ordinary skill in the art.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A monitoring system for measuring one or more quantities of multiple fluids of varied viscosities while being supplied to form a final mixture, the system comprising:
   a plurality of feed lines for feeding multiple fluids to a fluid intermixing device;
   a flow rate metering device coupled to the plurality of feed lines, wherein the flow rate metering device includes:
      a plurality of flow meters, where one flow meter being arranged per feed line to measure a flow rate of respective fluid during each of a plurality of operation cycles, wherein each of the plurality of flow meters having a digital display unit to display the flow rate of the respective fluid measured by that flow meter during each of the plurality of operation cycles; and
   a processor coupled to the flow rate metering device to measure the quantity of the respective fluid utilized during of the plurality of operation cycles based on the flow rate of that fluid, wherein each of the plurality of feed lines includes an input hole and an output hole, wherein each of the plurality of flow meters is mounted on a flow meter mounting plate using one or more mounting holes, wherein the mounting holes are counter sunk on one side for tapered machine screw, and wherein the mounting holes are formed of $\frac{1}{4}$" thick Schedule 80 PVC.

2. A monitoring system for measuring one or more quantities of multiple fluids of varied viscosities while being supplied to form a final mixture, the system comprising:
   a plurality of feed lines for feeding multiple fluids to a fluid intermixing device;
   a flow rate metering device coupled to the plurality of feed lines, wherein the flow rate metering device includes:
      a plurality of flow meters, where one flow meter being arranged per feed line to measure a flow rate of respective fluid during each operation cycle, wherein each of the plurality of flow meters having a digital display unit to display the flow rate of the respective fluid measured by that flow meter during each operation cycle; and
   a processor coupled to the flow rate metering device to measure the quantity of respective fluid utilized during each operation cycle based on the flow rate of that fluid, wherein each of plurality of the flow meters are mounted on a flow meter mounting plate using mounting holes, and wherein the mounting holes are formed of ¼" thick Schedule 80 PVC.

3. A flow rate metering device for measuring flow rate of multiple fluids of varied viscosities while being supplies to form a final mixture, the device comprising:
   a flow meter arranged on each of the plurality of feed lines of multiple fluids to measure a flow rate of respective fluid during each operation cycle; and
   a digital display unit coupled to each of the flow meters to display the flow rate of respective fluid during each operation cycle,
   wherein each of the plurality of flow meters is mounted on a flow meter mounting plate using one or more mounting holes, and wherein the mounting holes are formed of ¼" thick Schedule 80 PVC.

4. The monitoring system as claimed in claim 3, additionally comprising:
   a plurality of feed lines for feeding multiple fluids to a fluid intermixing device;
   a flow rate metering device coupled to the plurality of feed lines, wherein the flow rate metering device includes:
      a plurality of flow meters, where one flow meter being arranged per feed line to measure a flow rate of respective fluid during each operation cycle, wherein each of the plurality of flow meters having a digital display unit to display the flow rate of the respective fluid measured by that flow meter during each operation cycle; and
   a processor coupled to the flow rate metering device to measure the quantity of respective fluid utilized during each operation cycle based on the flow rate of that fluid.

5. The monitoring system as claimed in claim 3, the system consisting of: a plurality of feed lines for feeding multiple fluids to a fluid intermixing device;
   a flow rate metering device coupled to the plurality of feed lines, wherein the flow rate metering device includes:
      a plurality of flow meters, where one flow meter being arranged per feed line to measure a flow rate of respective fluid during each operation cycle, wherein each of the plurality of flow meters having a digital display unit to display the flow rate of the respective fluid measured by that flow meter during each operation cycle; and
   a processor coupled to the flow rate metering device to measure the quantity of respective fluid utilized during each operation cycle based on the flow rate of that fluid, wherein each of the plurality of feed lines includes an input hole and an output hole, wherein the flow meters are mounted on a flow meter mounting plate using mounting holes, wherein the mounting holes are counter sunk on one side for tapered machine screw, wherein the number of feed lines is four, the number of flow meters is one, and the mounting holes are formed of ¼" thick Schedule 80 PVC.

* * * * *